(12) United States Patent
DeSimone (10) Patent No.: US 9,878,652 B2
(45) Date of Patent: Jan. 30, 2018

(54) TAILGATE WITH INTEGRATED LOADING RAMP SYSTEM (71) Applicant: Steve DeSimone, Bluffton, SC (US)

(72) Inventor: Steve DeSimone, Bluffton, SC (US)

(*) Notice: Subject to any disclaimer, the term of this patent is extended or adjusted under 35 U.S.C. 154(b) by 0 days.

(21) Appl. No.: 14/814,492

(22) Filed: Jul. 30, 2015

(65) Prior Publication Data
US 2016/0031353 A1 Feb. 4, 2016

Related U.S. Application Data (60) Provisional application No. 62/031,137, filed on Jul. 30, 2014.

(51) Int. Cl.
B62D 33/03 (2006.01)
B60P 1/43 (2006.01)
B62D 33/027 (2006.01)

(52) U.S. Cl.
CPC .......... B60P 1/435 (2013.01); B62D 33/0273 (2013.01)

(58) Field of Classification Search
CPC ....... B62D 33/0273; B62D 33/08; B60P 3/40; B60P 1/435; B60P 3/07; B60J 11/00; Y10T 24/27; B60R 1/003
USPC ...................... 296/57.1, 50, 51, 61
See application file for complete search history.

(56) References Cited

U.S. PATENT DOCUMENTS

| 4,923,360 | A  | * | 5/1990  | Beauchemin | B60P 1/435 14/69.5 |
| 5,540,474 | A  | * | 7/1996  | Holland    | B60P 1/435 296/61 |
| 5,816,638 | A  | * | 10/1998 | Pool, III  | B60P 1/435 296/26.11 |
| 5,826,932 | A  | * | 10/1998 | DeSimone   | B60P 3/40 296/26.11 |
| 5,857,724 | A  | * | 1/1999  | Jarman     | B62D 33/0273 296/26.11 |
| 6,378,927 | B1 | * | 4/2002  | Parry-Jones | B60P 1/435 296/61 |
| 6,834,903 | B2 | * | 12/2004 | Harper     | B62D 33/03 296/51 |
| 6,948,755 | B1 | * | 9/2005  | Bauer      | B60P 1/435 296/37.6 |
| 6,991,277 | B1 | * | 1/2006  | Esler      | B60P 1/435 296/26.08 |
| 7,258,384 | B2 | * | 8/2007  | Drabik     | B60P 1/435 14/69.5 |
| 7,309,202 | B1 | * | 12/2007 | Anderson   | B60P 1/431 108/44 |
| 7,524,156 | B2 | * | 4/2009  | Garbes     | B60P 1/43 296/37.6 |
| 7,533,923 | B1 | * | 5/2009  | Caldwell   | B60P 1/431 296/61 |
| 7,771,154 | B2 | * | 8/2010  | Ehler      | B60P 1/435 296/61 |

(Continued)

Primary Examiner — Kiran B Patel
(74) Attorney, Agent, or Firm — The Dobrusin Law Firm, PC (57) ABSTRACT A cargo bed tailgate may include an extension configurable between a plurality of positions to enable oversized cargo to be securely carried on a cargo bed as well accommodate a deployable set of loading ramps which are storable within the tailgate and deployable to attach to the cargo bed extension after the cargo bed extension is moved and locked for the loading and unloading of a payload into or out of the cargo bed of the vehicle.

20 Claims, 11 Drawing Sheets (56) References Cited

U.S. PATENT DOCUMENTS

| | | | | |
|---|---|---|---|---|
| 8,109,552 B2* | 2/2012 | Nelson | B62D 33/0273 | 224/403 |
| 8,827,343 B2* | 9/2014 | Peters | B62D 33/04 | 296/37.6 |
| 9,067,525 B1* | 6/2015 | Ninov | B60P 1/43 | |
| 9,162,602 B2* | 10/2015 | Wendinger | B60P 1/435 | |
| 9,346,390 B1* | 5/2016 | Croswhite | B60P 1/435 | |
| 9,616,795 B1* | 4/2017 | Vick | B62D 33/023 | |
| 9,738,204 B1* | 8/2017 | Stojkovic | B60P 1/435 | |
| 2002/0031422 A1* | 3/2002 | Schilling | B60P 3/122 | 414/477 |
| 2002/0145300 A1* | 10/2002 | Webber | B60P 1/43 | 296/61 |
| 2002/0172584 A1* | 11/2002 | Huggins | B60P 7/13 | 414/498 |
| 2003/0015885 A1* | 1/2003 | Landwehr | B60P 1/435 | 296/61 |
| 2003/0071476 A1* | 4/2003 | Schilling | B60P 1/435 | 296/61 |
| 2003/0168874 A1* | 9/2003 | Bautista, Jr. | B60P 1/435 | 296/10 |
| 2004/0032142 A1* | 2/2004 | Sherrer | B60P 1/435 | 296/61 |
| 2006/0045703 A1* | 3/2006 | Dougherty | B60P 1/435 | 414/537 |
| 2007/0182192 A1* | 8/2007 | Meyers | B60P 1/43 | 296/50 |
| 2007/0228761 A1* | 10/2007 | Dryja | B60R 3/02 | 296/62 |
| 2008/0042464 A1* | 2/2008 | Hutchins, Jr. | B60P 1/435 | 296/61 |
| 2008/0174138 A1* | 7/2008 | Huggins | B60P 1/435 | 296/61 |
| 2008/0231067 A1* | 9/2008 | Nagle | B60P 3/07 | 296/50 |
| 2008/0267729 A1* | 10/2008 | Barker | B60P 1/43 | 410/3 |
| 2008/0284194 A1* | 11/2008 | Bower | B60P 3/07 | 296/61 |
| 2009/0044729 A1* | 2/2009 | Navarre | B60P 1/43 | 108/44 |
| 2009/0102216 A1* | 4/2009 | Hanzel | B60P 1/26 | 296/26.11 |
| 2009/0108614 A1* | 4/2009 | Washington | B60P 1/435 | 296/61 |
| 2011/0057469 A1* | 3/2011 | Zielinsky | B60P 1/267 | 296/57.1 |
| 2011/0072596 A1* | 3/2011 | Kenny | B60P 1/435 | 14/69.5 |
| 2011/0121602 A1* | 5/2011 | Zielinsky | B62D 33/0273 | 296/57.1 |
| 2011/0163565 A1* | 7/2011 | Zielinsky | B62D 33/0273 | 296/57.1 |
| 2011/0181068 A1* | 7/2011 | Zielinsky | B60P 1/26 | 296/57.1 |
| 2012/0139281 A1* | 6/2012 | Cousino | B60P 1/435 | 296/61 |
| 2013/0028693 A1* | 1/2013 | Justak | B60P 1/435 | 414/480 |
| 2013/0094930 A1* | 4/2013 | Kalergis | B60P 1/43 | 414/523 |
| 2013/0175820 A1* | 7/2013 | Lepage | B60P 3/40 | 296/26.08 |
| 2014/0182087 A1* | 7/2014 | St. Jean | B60P 7/0823 | 24/298 |
| 2016/0031353 A1* | 2/2016 | DeSimone | B60P 1/435 | 296/57.1 |
| 2016/0144759 A1* | 5/2016 | DiBlasio | B60P 1/435 | 414/537 |

* cited by examiner

TAILGATE WITH INTEGRATED LOADING RAMP SYSTEM

CROSS-REFERENCE TO RELATED APPLICATION

This nonprovisional U.S. patent application claims priority to and incorporates herein for all purposes U.S. provisional patent application No. 62/031,137, filed Jul. 30, 2014 in the name of Steve DeSimone and entitled TAILGATE WITH INTEGRATED LOADING RAMP SYSTEM.

FIELD

The present disclosure generally relates to vehicles used for transporting cargo and related items such as a pickup truck including a tailgate. More particularly, the present disclosure relates to a highly functional, integrated and flexible tailgate for use on a pickup truck or other type vehicle including a cargo area including an opening.

BACKGROUND

Generally, it is known to provide a vehicle with a tailgate for closing out an opening of a cargo area of the vehicle and to provide the tailgate with open and close function. The tailgate maybe used as a work surface in a generally horizontal or open position and may be used to close an opening in a cargo area of a vehicle when in the vertical or closed position.

DETAILED DESCRIPTION

Figure 1:
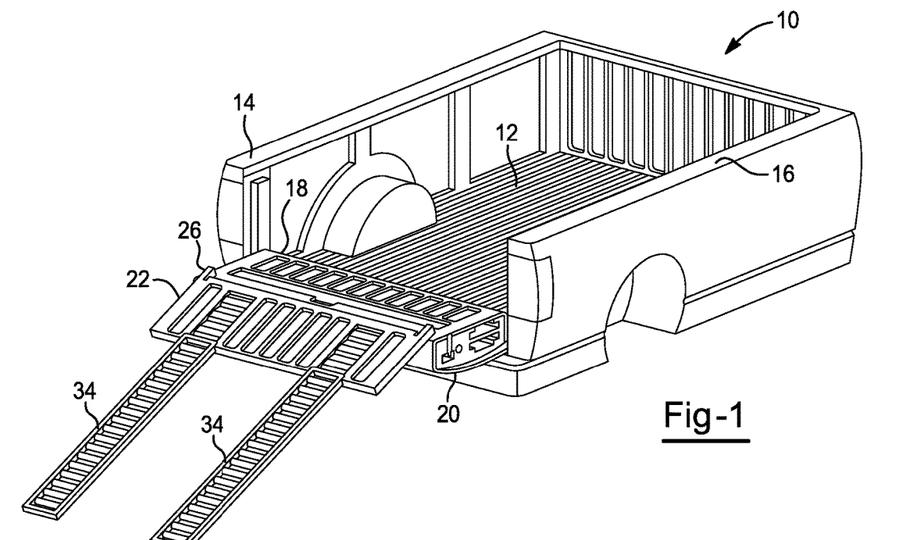
FIG. 1 is a perspective view of a cargo area of a vehicle including a tailgate according to the present disclosure.
Figure 2:
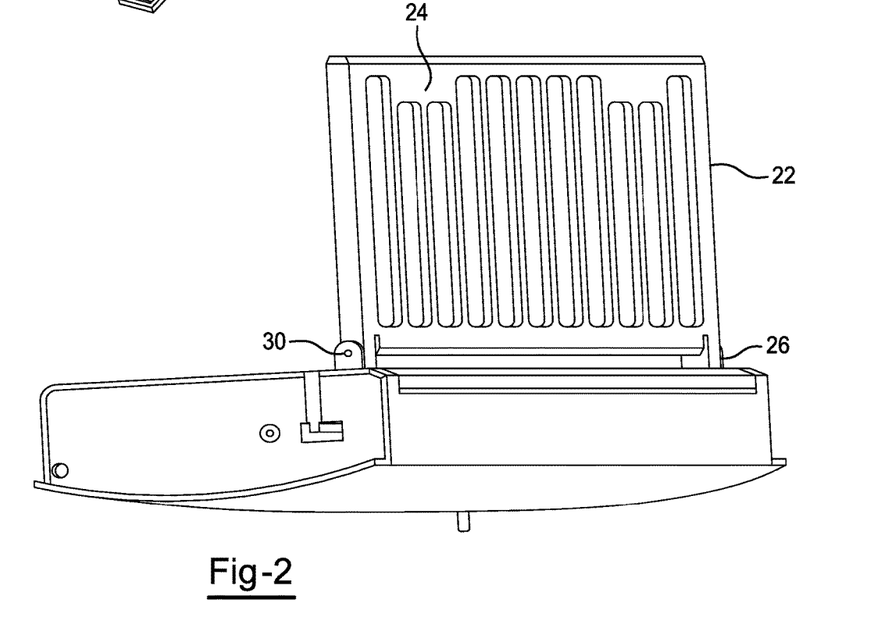
FIG. 2 is a perspective view of the tailgate of FIG. 1.

Referring in general to all of the Figures there is illustrated, as best shown in FIG. 1, a pickup truck cargo compartment 10 that may include a pair of sidewalls 14 and 16. The sidewalls 14 and 16 may be oppositely disposed along the longitudinal sides of the bed 12, and may project generally perpendicularly upward from the bed. The bed 12 may terminate at a rear edge 18 of the cargo compartment at which location a tailgate door or other suitable barrier may be attached. While a pickup truck cargo compartment is represented in the FIG. 1, those skilled in the art may appreciate that the teachings of this disclosure may be generally applicable and adapted to any type of vehicle equipped with a cargo bed adapted to transport cargo.

In accordance with the features of the present disclosure, there is shown a bed extension 22 that may be attached to the bed 12 of the truck cargo compartment 10 at its rear edge 18, and may serve to safely accommodate oversized cargo on the bed 12 that would otherwise extend beyond the rear edge 18 of the cargo compartment 10. The bed extension 22 may include a substantially planar loading platform or ramp 24 which may be pivotably attached to the tailgate door 20 near the top thereof. The loading platform 24 may be substantially the same width as the tailgate door 20. The lateral ends of the loading platform 24 may include an extended lug portion 26, along each side thereof, to pivotably attach the bed extension 22 to the tailgate door 20. Each lug portion 26 may include a guide slot 36 for receiving a mounting bolt 30 after the extended lug portions 26 are placed into a boss 32 that may be securely attached at each side to the tailgate door 20. To avoid interference with loading or unloading of cargo, the boss 32 may be located in a recess in the inner panel of the tailgate door to avoid being an obstacle to loading or unloading cargo—particularly when the loading platform 24 may be removed. In fact, it is contemplated that each lug portion 26 of the bed extender may be coupled or attached to a cross-pin (not shown) mounted underneath the bed 12 of the cargo compartment 10 to avoid the use of a boss 32 that could become a hindrance to loading or unloading cargo.

Figure 3:
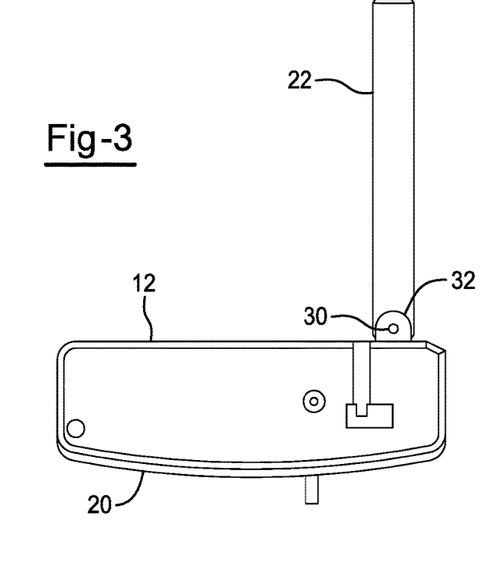
FIG. 3 is a side view of the tailgate of FIGS. 1 and 2.
Figure 4:
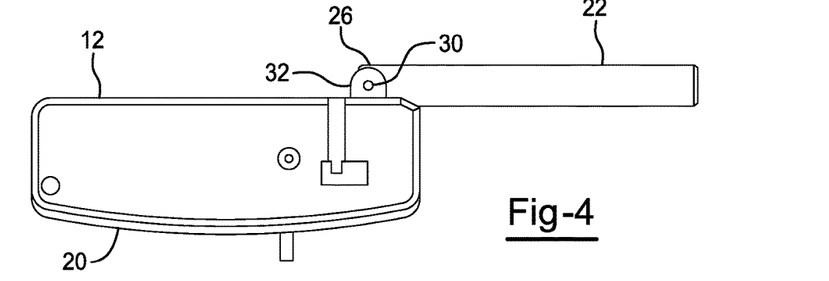
FIG. 4 is a side view of the tailgate of FIGS. 1 and 2 in an alternate position.
Figure 5:
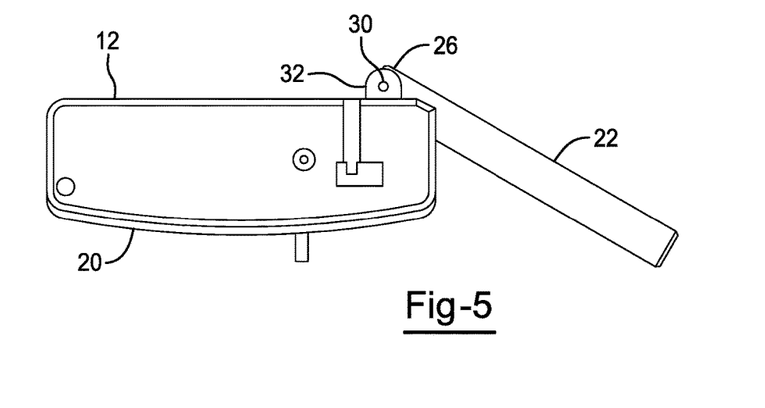
FIG. 5 is a side view of the tailgate of FIGS. 1-3 in a further alternate position.

Referring in particular to FIGS. 3 through 5, the bed extension 22 may assume any one of three positions other than its storage position. FIG. 3 illustrates a position at 90 degrees to the horizon, after the tailgate door 20 has been opened. In this vertical position, the bed extension 22 may be locked so that the bed extension 22 retains oversized cargo within the cargo compartment 10. FIG. 4 illustrates a position 180 degrees from its storage position or substantially co-planar with the cargo bed 12 so that it substantially extends the length of the tailgate and may support cargo. In this embodiment, it is contemplated that the tailgate and/or the bed extension may include any of a variety of cargo securing devices including an extension member or strap for securing cargo.

Figures 6, 7:
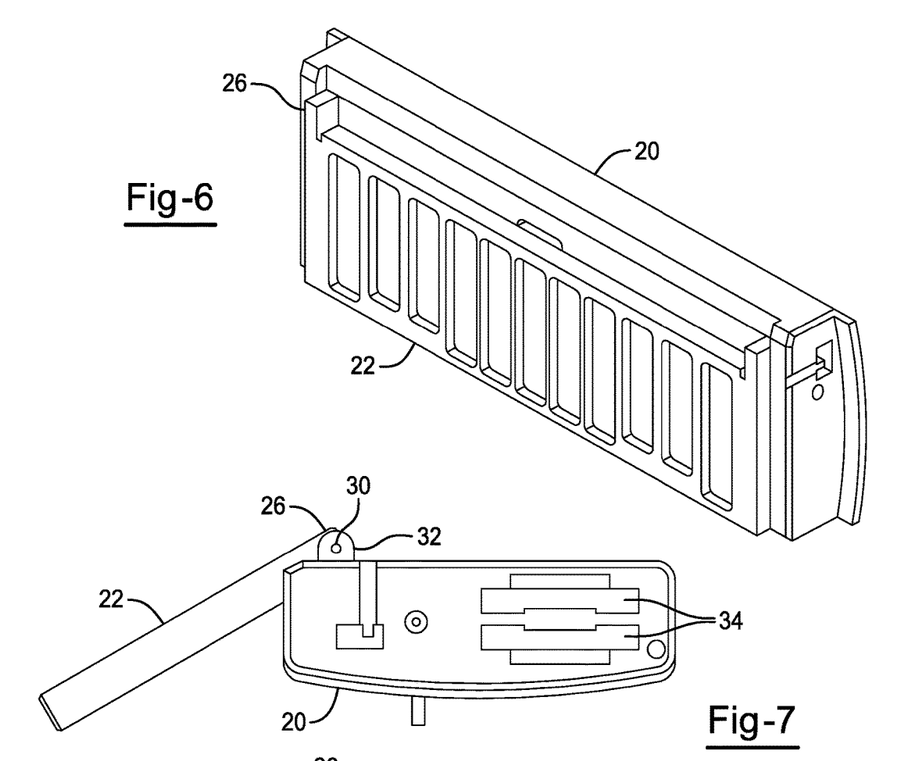
FIG. 6 is an alternate perspective view of the tailgate of the above figures in a closed position.
FIG. 7 is an opposite side view of the tailgate of FIG. 5 showing the storage compartments for the ramps stored in the tailgate according to the present disclosure.

As in the 90 degree position, the bed extension 22 may be locked to prevent it from further rotation. In this position, the bed extension 22 provides support for cargo of extended loads. The bed extension 22 may be rotatably deployed to 210 degrees, as shown in FIG. 5, and locked in position to receive two loading ramps 34 that may be stored within passaged located in the tailgate door 20, as shown in FIG. 7. FIG. 1 best illustrates the two loading ramps attached and locked to the bed extension 22 with the bed extension 22 deployed or rotated and locked at 210 degrees from the stowed position against the inner panel of the tailgate door 20. In this position, wheeled vehicles, such as ATV, motorcycles, mowers and/or lawn or any other known device (including a human) may more easily be loaded into the cargo compartment of the vehicle equipped with the device of the present disclosure.

Figure 8:
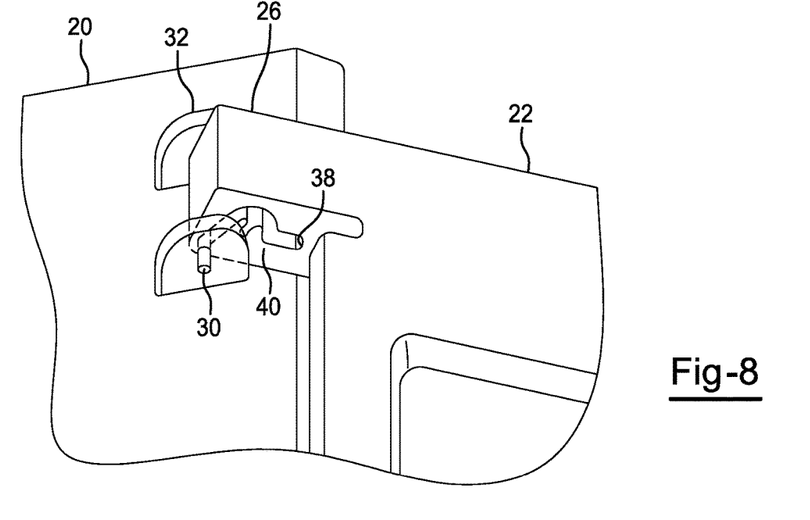
FIG. 8 is a partial perspective alternate view of a hinge mechanism.
Figures 9, 10, 11:
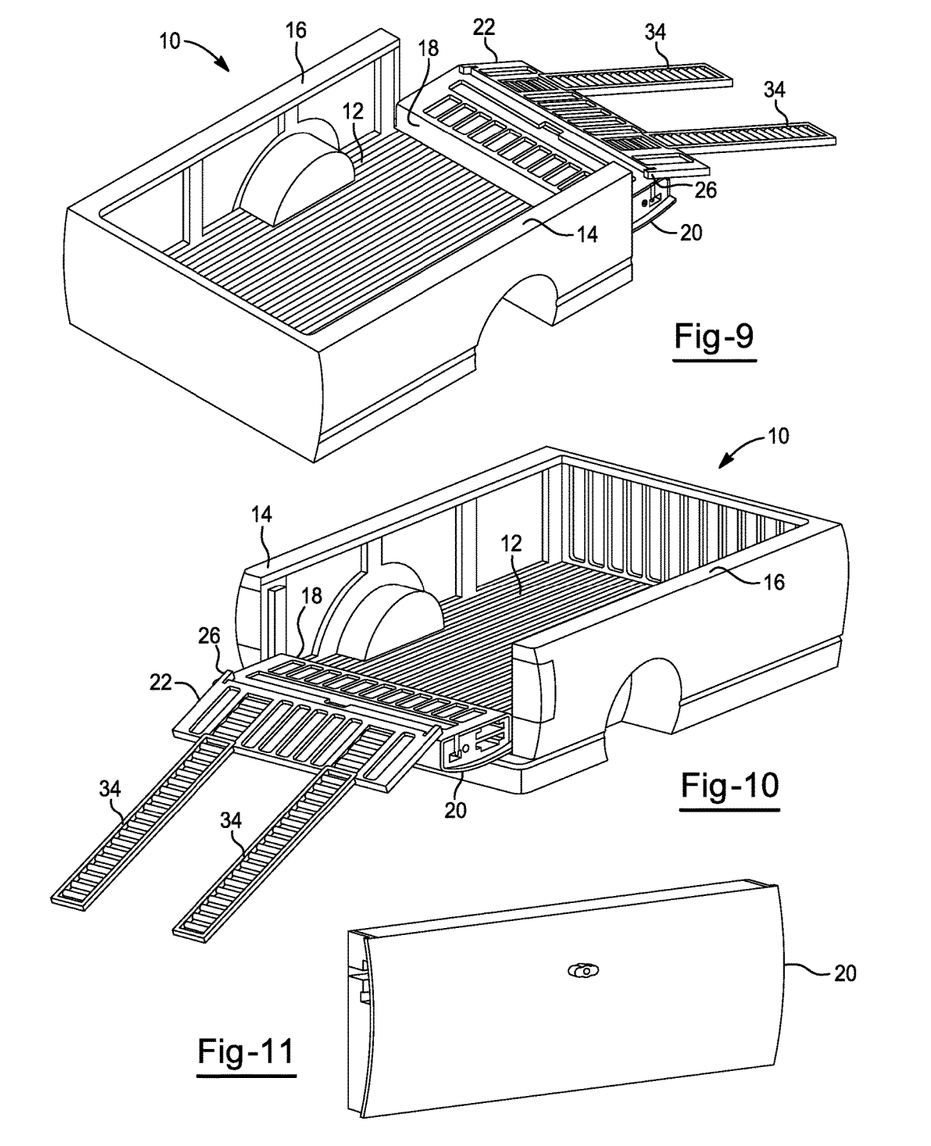
FIG. 9 is an alternate perspective view of the cargo area and tailgate of the present disclosure.
FIG. 10 is a further alternate perspective view of the cargo area and tailgate of the present disclosure.
FIG. 11 is an alternate perspective view of the end view of the tailgate of the present disclosure.
Figure 12:
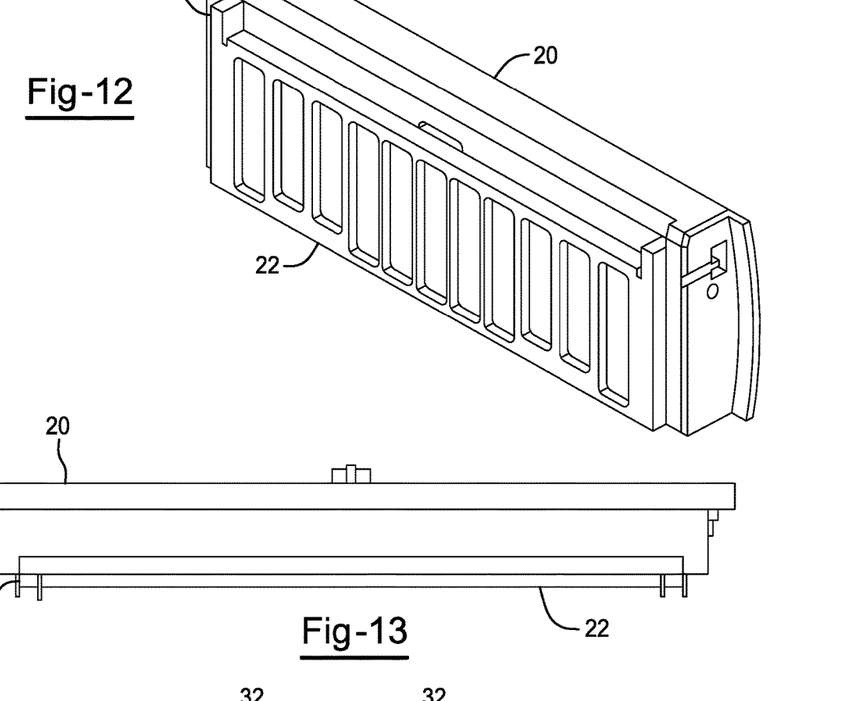
FIG. 12 is a further alternate perspective view of the end view of the tailgate of the present disclosure.
Figures 13, 14, 15:
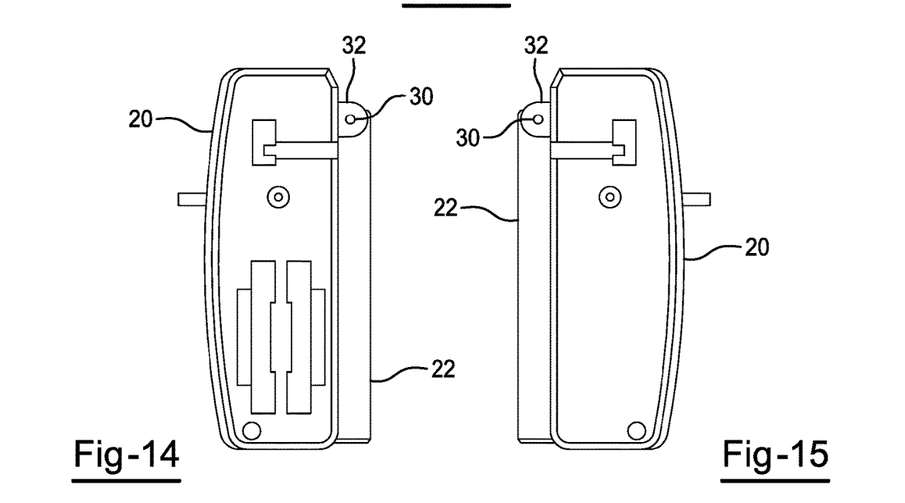
FIG. 13 top view of the tailgate of the present disclosure.
FIG. 14 is an alternate end view of the tailgate of the present disclosure.
FIG. 15 is an opposite end view of the tailgate of the present disclosure.
Figure 16:
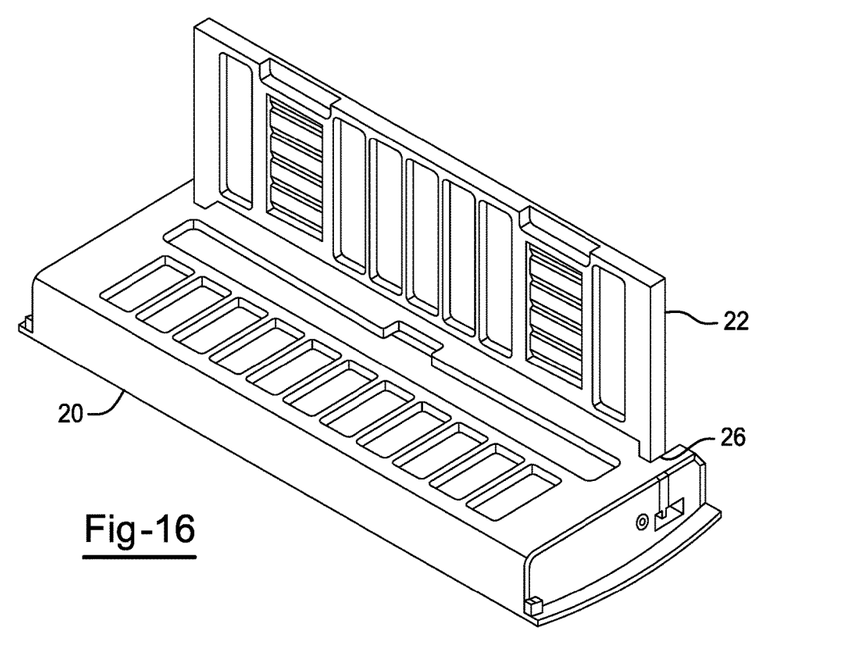
FIG. 16 is a further alternate perspective view of the tailgate of the present disclosure in an alternate position.
Figures 17, 18:
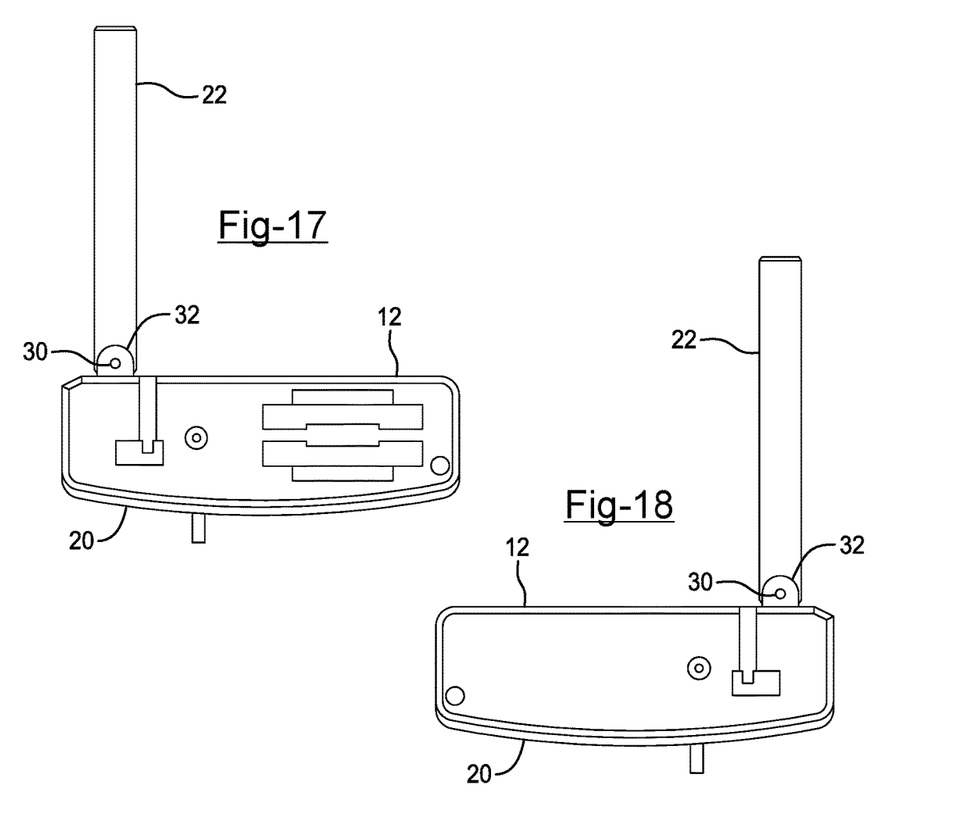
FIG. 17 is a further alternate end view of the tailgate of the present disclosure in an alternate position.
FIG. 18 is an opposite end view of the tailgate of FIG. 17.
Figure 19:
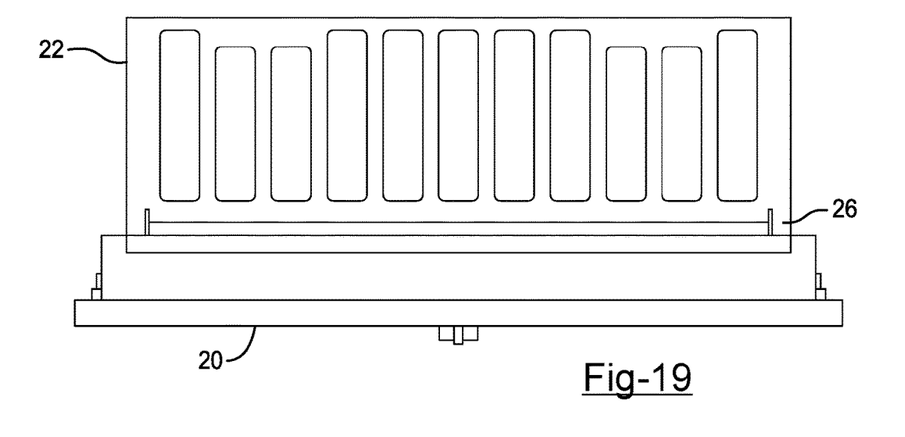
FIG. 19 is an alternate top view of the tailgate of the present disclosure in an alternate position.
Figure 20:
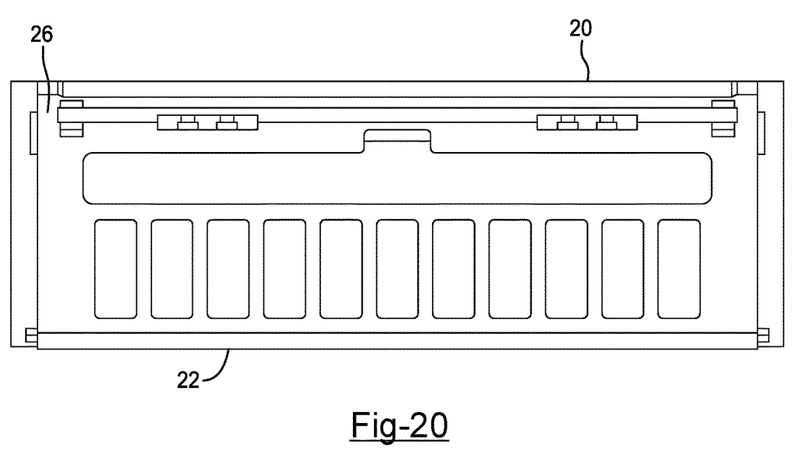
FIG. 20 is an alternate view of the tailgate of FIG. 19.
Figure 21:
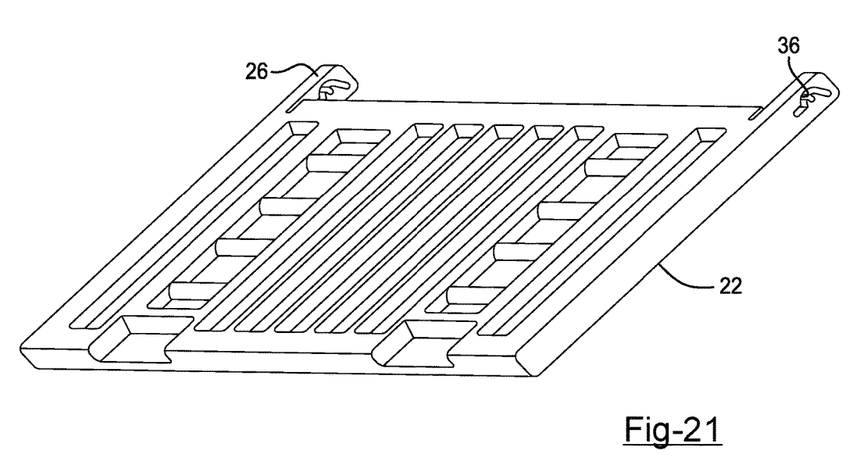
FIG. 21 is an alternate embodiment of the tailgate of the present disclosure showing a generally planar ramp for coupling with the tailgate of the present disclosure.
Figures 22, 23:
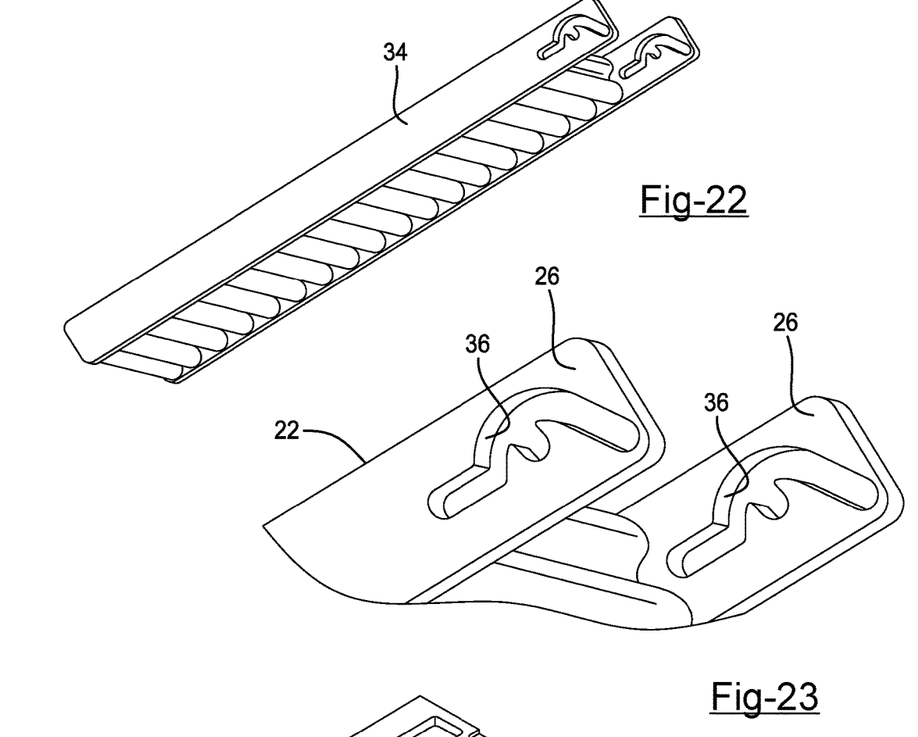
FIG. 22 is an alternate view of the ramp of the present disclosure.
FIG. 23 is an isolated view of the end of the ramp of FIGS. 21 and 22 detailing a passage in the end sections of the ramp for coupling with the tailgate of the present disclosure.
Figure 24:
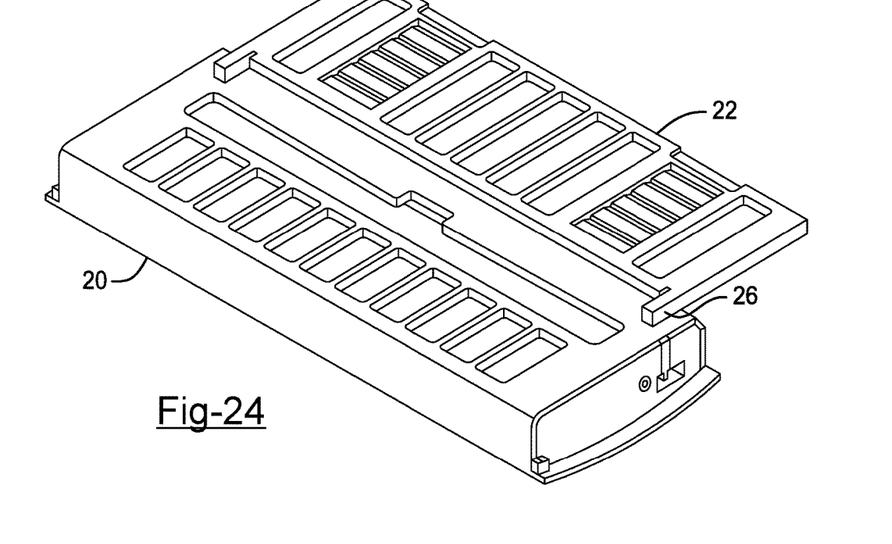
FIG. 24 is an alternate perspective view of the tailgate of the present disclosure in a further alternate configuration of the tailgate according to the present disclosure.
Figure 25:
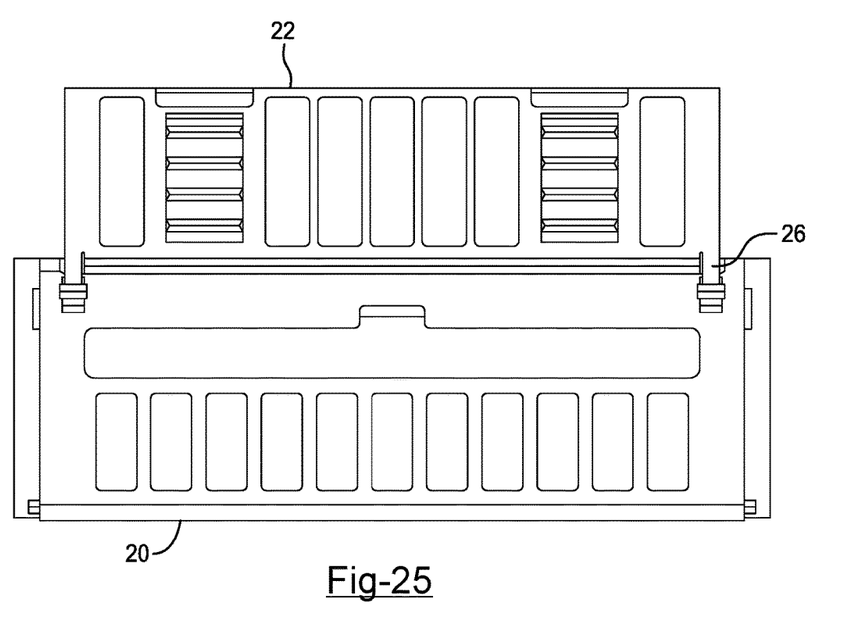
FIG. 25 is an alternate top view of the tailgate of the present disclosure.
Figure 26:
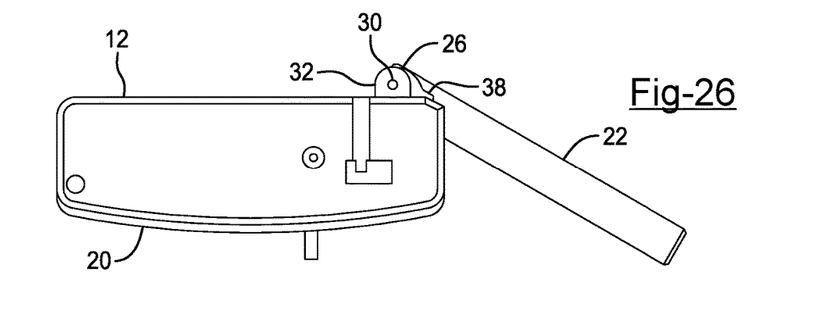
FIG. 26 is an alternate end view of the tailgate of the present disclosure of FIG. 25.
Figure 27:
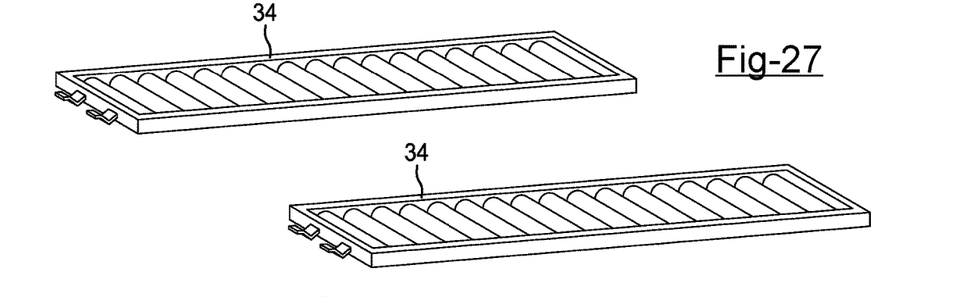
FIG. 27 is an alternate perspective view of the ramps of FIG. 10 of the present disclosure.
Figure 28:
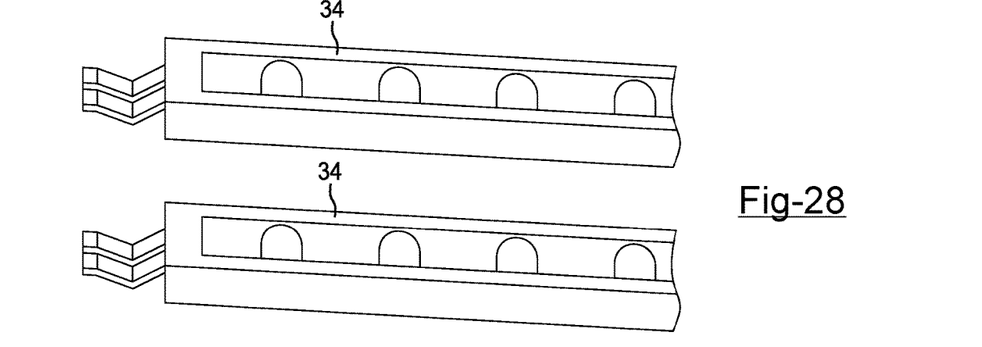
FIG. 28 is an alternate perspective view of the ramps of FIG. 27.

FIG. 8 is a close-up of the extended lug portion 26 of the bed extension 22 which illustrates the guide slot 36 which may cut into the extended lug portion 26 to provide the three locked positions of the bed extension 22. The position shown in FIG. 8 is the bed extension located at approximately 210 degrees from the horizontal plane such as that defined by the bed of the pickup truck vehicle. The bolt 30 may be at the end of the guide slot 36 when the bed extension 22 is rotated to the horizontal position 180 degrees from the horizontal plane such as that defined by the bed of the pickup truck vehicle and the bolts 30 may move into the opposing ends 38 of the guide slots 36. With the bed extension in a vertical position as best shown in FIG. 3, the bolt 30 may be locked into the medial slot 40 so that the bed extension retains oversized cargo in the cargo bed.

A further feature of the present disclosure is that the cargo bed extension 22 may include the passages for receiving and retaining the ramps, illustrated in FIG. 1, for providing readily and always available easy access to the cargo bed for wheeled vehicles and equipment such as an ATV, motorcycle, a lawn tractor or mower.

Figure 29:
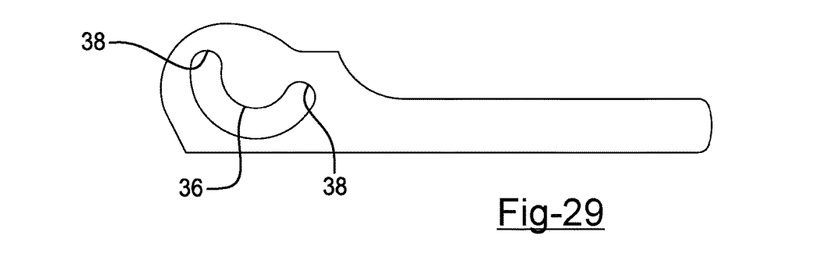
FIG. 29 is an alternate embodiment detailing an alternative design of the end sections as suggested in FIG. 23.

An alternate end bracket and channel design is shown in FIG. 29 for coupling the tailgate to the cargo area of the vehicle.

As disclosed hereinabove, the cargo bed extension may be designed to fold and lock into four (4) distinct positions. When not in use, as shown in FIG. 6, the bed extension 22 may be folded and secured to the inner sidewalls of the tailgate door 20. While in the stowed position, the bed extension 22 may be locked or, alternatively, may be secured to the sidewall of the tailgate door 20 with any suitable type of latch. As best shown in FIG. 1, the height of the bed extension may not be greater than and approximately equal to, the height of the sidewalls 14, 16 above the bed 12 of the cargo area but it is contemplated that other arrangements are possible. As such, the bed extension 22 does not project above the sidewalls 14, 16 when the bed extension 12 is in its stowed and locked position.

After the tailgate door 20 is lowered, the bed extension 22 may be rotated to a 90 degree vertical position and locked at such position. In this position, the bed extension retains oversized cargo within the cargo bed. The bed extension 22 may be further deployed to 180 degrees so that it may be located substantially co-planar with the cargo bed 12. In this position, the bed extension 22 may be locked to receive and support cargo including extended loads. Lastly, the bed extension 22 may be further rotated to approximately 210 degrees from the horizontal plane as defined by the bed of the pickup truck vehicle and locked into place in order to receive the two loading ramps 34 that are stored within the confines of the tailgate door 20 as best shown in FIG. 7.

Alternative arrangements are possible in view of the present disclosure.

The present description is intended to be illustrative and not restrictive. Many embodiments as well as many applications besides the exemplary embodiments disclosed will be apparent to those of ordinary skill in the relevant art upon understanding the present disclosure. The scope of the claimed invention should not be determined with limiting reference to the description but should instead be determined with reference to the appended claims along with the full scope of equivalents to which such claims are entitled. Any disclosure of an article or reference, including patent applications and publications, is incorporated by reference herein for all purposes. Any omission in the claims of any aspect of subject matter disclosed herein is not a disclaimer of such subject matter.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless expressly stated, all ranges are intended to include both endpoints and all numbers between the endpoints. The use of "generally," "about" or "approximately", or similar words, in connection with a range applies to both ends of the range. Thus, "about 20 to 30" is intended to cover "about 20 to about 30", inclusive of at least the specified endpoints.

The disclosure of "a" or "one" to describe an element, ingredient, component or step is not intended to foreclose additional elements, ingredients, components or steps. Plural elements, ingredients, components or steps may be provided by a single integrated element, ingredient, component or step. Alternatively, a single integrated element, ingredient, component or step may include separate plural elements, ingredients, components or steps.

What I claim is:

1. A door assembly for a vehicle having a body defining a rear cargo area and an opening, the door comprising:

a tailgate door adapted to selectively pivot in a first direction with respect to the rear cargo area to form a drop-style tailgate door for closing the opening of the cargo area;

a bed extension apparatus operatively connected to an inner surface of the tailgate door; the bed extension apparatus being deployable from a stowed position to a first substantially vertical position 90 degrees to the tailgate door when the tailgate door is in a drop down position, the bed extension apparatus being further deployable to a second substantially horizontal position 180 degrees to the tailgate door when the tailgate door is in the drop down position, the bed extension apparatus being still further deployable to a third position substantially 210 degrees to the tailgate door when the tailgate door is in the drop down position;

a pair of retractable loading ramps stored within the confines of the tailgate door; and one or more locks for securing the pair of loading ramps to the bed extension apparatus, the loading ramps providing rigid support for loading or unloading a wheeled vehicle onto the rear cargo area of the vehicle;

wherein the bed extension apparatus receives the loading ramps only when the bed extension apparatus is in the third position.

2. A door assembly for a vehicle having a body defining a rear cargo area and an opening, the door comprising:

a tailgate door adapted to selectively pivot in a first direction with respect to the rear cargo area to form a drop-style tailgate door;

a bed extension apparatus being deployable from a stowed position to a first substantially vertical position 90 degrees to the tailgate door when the tailgate door is in a drop down position, the bed extension apparatus being further deployable to a second substantially horizontal position 180 degrees to the tailgate door when the tailgate door is in the drop down position, the bed extension apparatus being still further deployable to a third position substantially 210 degrees to the tailgate door when the tailgate door is in the drop down position; and a pair of retractable loading ramps stored within the confines of the tailgate door;

one or more locks for securing the pair of loading ramps to the bed extension apparatus, the loading ramps providing rigid support for loading or unloading a wheeled vehicle onto the rear cargo area of the vehicle.

3. The door assembly according to claim 2, wherein the bed extension apparatus is pivotally engaged with an edge of the tailgate door by one or more securing mechanisms.

4. The door assembly according to claim 2, wherein one or more bosses project substantially perpendicular from the inner surface of the tailgate door to receive one or more lug portions of the bed extension apparatus.

5. The door assembly according to claim 4, wherein the bed extension apparatus is removably attached to the tailgate door by inserting a bolt through a receiving hole of each of the one or more bosses, and further through a guide hole of each of the one or more lug portions.

6. The door assembly according to claim 2, wherein the bed extension apparatus is moved to each position relative to the tailgate door when secured to one or more lug portions of the bed extension apparatus.

7. The door assembly according to claim 6, wherein the one or more lug portions of the bed extension apparatus are received by one or more bosses projecting substantially perpendicular from the inner surface of the tailgate, and wherein a bolt is inserted through a receiving hole of each of the one or more bosses, and further through the guide hole of the one or more lug portions.

8. The door assembly according to claim 4, wherein the one or more bosses are recessed relative to the inner surface of the tailgate door so that the one or more bosses are flush with the inner surface to avoid interference when loading or unloading the rear cargo area.

9. The door assembly according to claim 2, wherein the bed extension apparatus receives the loading ramps only when the bed extension apparatus is in the third position.

10. The door assembly according to claim 5, wherein the guide hole of each of the one or more lug portions allows the bed extension apparatus to move freely to each position while remaining attached to the tailgate door.

11. The door assembly according to claim 10, wherein the bed extension apparatus can be repositioned between each of the three positions without removing the bolt by disengaging a current locking position and engaging a desired locking position.

12. The door assembly according to claim 1, wherein the one or more locks for securing the pair of loading ramps are passages integrally formed in the bed extension apparatus to receive the loading ramps and substantially decrease unwanted movement of the loading ramps during loading and unloading.

13. The door assembly according to claim 2, wherein the one or more locks for securing the pair of loading ramps are passages integrally formed in the bed extension apparatus to receive the loading ramps and substantially decrease unwanted movement of the loading ramps during loading and unloading.

14. The door assembly according to claim 1, wherein a side of the tailgate door includes an opening to one or more cavities to store the loading ramps.

15. The door assembly according to claim 2, wherein a side of the tailgate door includes an opening to one or more cavities to store the loading ramps.

16. The door assembly according to claim 14, wherein the loading ramps have a length equal to or less than a width of the tailgate door so that the loading ramps do not protrude through the opening of the tailgate door when stored.

17. The door assembly according to claim 15, wherein the loading ramps have a length equal to or less than a width of the tailgate door so that the loading ramps do not protrude through the opening of the tailgate door when stored.

18. The door assembly according to claim 1, wherein a shape of the bed extension apparatus is substantially similar to a shape of the tailgate door.

19. The door assembly according to claim 2, wherein a shape of the bed extension apparatus is substantially similar to a shape of the tailgate door.

20. The door assembly according to claim 2, where the tailgate door further includes a latch to lock the bed extension apparatus in the stowed position.

* * * * *